(12) United States Patent
Isami et al.

(10) Patent No.: US 12,409,739 B2
(45) Date of Patent: Sep. 9, 2025

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Tatsuya Imamura, Okazaki (JP); Kenji Mizutani, Toyota (JP); Tsuyoshi Okada, Nagoya (JP); Naoki Yamamuro, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/930,392

(22) Filed: Oct. 29, 2024

(65) Prior Publication Data

US 2025/0145023 A1    May 8, 2025

(30) Foreign Application Priority Data

Nov. 8, 2023 (JP) ................. 2023-190497

(51) Int. Cl.
*B60L 15/34* (2006.01)
*B60L 15/20* (2006.01)

(52) U.S. Cl.
CPC .......... *B60L 15/2054* (2013.01); *B60L 15/34* (2013.01); *B60L 2240/423* (2013.01); *B60L 2240/486* (2013.01); *B60L 2250/24* (2013.01); *B60L 2250/26* (2013.01); *B60W 2540/10* (2013.01); *B60W 2540/12* (2013.01); *B60W 2540/14* (2013.01)

(58) Field of Classification Search
CPC ................. B60L 15/2054; B60L 15/34; B60L 2240/423; B60L 2240/486; B60L 2250/24; B60L 2250/26; B60W 2540/10; B60W 2540/12; B60W 2540/14
See application file for complete search history.

(56) References Cited

U.S. PATENT DOCUMENTS

| 2013/0035817 A1 | 2/2013 | Bahar et al. |
| 2014/0195088 A1 | 7/2014 | Schuessler |
| 2021/0229550 A1 | 7/2021 | Isami |
| 2021/0387529 A1 | 12/2021 | Oh et al. |

(Continued)

FOREIGN PATENT DOCUMENTS

| JP | 6787507 B1 | 11/2020 |
| JP | 2022-036908 A | 3/2022 |
| JP | 2022044955 A * | 3/2022 |

*Primary Examiner* — Justin Holmes
(74) *Attorney, Agent, or Firm* — Finnegan, Henderson, Farabow, Garrett and Dunner, LLP

(57) ABSTRACT

A battery electric vehicle includes: a driving operation member configured to be used to drive the battery electric vehicle; and a pseudo shifting operation member that imitates an operation member configured to be used to perform a shifting operation of a manual transmission internal combustion engine vehicle. A controller that controls the battery electric vehicle is configured to execute, according to selection by a driver, a control mode in which an operation of the pseudo shifting operation member is associated with torque of the electric motor. The controller is further configured to impose, when in the control mode, a restriction on an operation the battery electric vehicle performs in response to the operation of the pseudo shifting operation member, the restriction being able to be removed or eased.

11 Claims, 11 Drawing Sheets

(56) References Cited

U.S. PATENT DOCUMENTS

| | | |
|---|---|---|
| 2022/0063494 A1 | 3/2022 | Duo' et al. |
| 2023/0302918 A1* | 9/2023 | Solt .................. B60L 15/20 |
| 2023/0382238 A1* | 11/2023 | Isami ................. B60L 15/20 |

* cited by examiner

BATTERY ELECTRIC VEHICLE

CROSS-REFERENCE TO RELATED APPLICATION

This application claims priority to Japanese Patent Application No. 2023-190497 filed on Nov. 8, 2023, incorporated herein by reference in its entirety.

BACKGROUND

1. Technical Field

The present disclosure relates to battery electric vehicles including an electric motor as a driving source.

2. Description of Related Art

Japanese Patent No. 6787507 (JP 6787507 B) discloses a technique related to a battery electric vehicle that can control an electric motor to simulate manual shifting operations of a vehicle with a manual transmission powered by an internal combustion engine. Hereinafter, a vehicle with a manual transmission powered by an internal combustion engine will be referred to as "manual transmission internal combustion engine vehicle." Japanese Unexamined Patent Application Publication No. 2022-036908 (JP 2022-036908 A) also discloses a related technique.

SUMMARY

The above techniques allow a driver to experience as if he or she were operating a manual transmission internal combustion engine vehicle while driving a battery electric vehicle. However, a driver who has not operated a manual transmission internal combustion engine vehicle for a long time and a driver who has no experience of operating a manual transmission internal combustion engine vehicle may hesitate to drive a battery electric vehicle in a control mode that simulates a manual transmission internal combustion engine vehicle.

The present disclosure provides a battery electric vehicle that allows a driver who has not driven a manual transmission internal combustion engine vehicle for a long time and a driver who has no experience driving a manual transmission internal combustion engine vehicle to easily experience as if they were operating a manual transmission internal combustion engine vehicle.

A battery electric vehicle according to one embodiment of the present disclosure includes: an electric motor configured to serve as a driving source for the battery electric vehicle; a driving operation member configured to be used to drive the battery electric vehicle; a pseudo shifting operation member that imitates an operation member configured to be used to perform a shifting operation of a manual transmission internal combustion engine vehicle; and a controller. The controller is configured to control the battery electric vehicle according to an operation of the driving operation member. The controller is configured to execute, according to selection by a driver, a control mode in which an operation of the pseudo shifting operation member is associated with torque of the electric motor. The controller is further configured to impose, when in the control mode, a restriction on an operation the battery electric vehicle performs in response to the operation of the pseudo shifting operation member, the restriction being able to be removed or eased.

The controller may further be configured to remove or ease the restriction when the driver meets a predetermined condition regarding the operation of the pseudo shifting operation member in the control mode. The controller may further be configured to provide information about the operation of the pseudo shifting operation member for the driver to meet the condition to the driver via the interface during driving in the control mode. The controller may further be configured to provide advice or feedback regarding the operation of the pseudo shifting operation member by the driver to the driver via the interface during driving in the control mode. The controller may further be configured to set the restriction in response to an instruction received from the driver. The controller may further be configured to set the restriction when the battery electric vehicle is located within a predetermined area.

According to one aspect of the present disclosure, the driving operation member may include an accelerator pedal. The pseudo shifting operation member may include a pseudo H-shifter imitating an H-shifter of a manual transmission, and a pseudo clutch operation device imitating a clutch operation device. The controller may be configured to, when in the control mode, change the torque of the electric motor according to a shift position selected with the pseudo H-shifter, an amount of operation of the pseudo clutch operation device, and an amount of operation of the accelerator pedal.

According to another aspect of the present disclosure, the driving operation member may include an accelerator pedal. The pseudo shifting operation member may include a pseudo sequential shifter imitating a sequential shifter of a manual transmission. The controller may be configured to, when in the control mode, change the torque of the electric motor according to a shift position selected with the pseudo sequential shifter and an amount of operation of the accelerator pedal.

According to still another aspect of the present disclosure, the driving operation member may include an accelerator pedal. The pseudo shifting operation member may include a pseudo H-shifter imitating an H-shifter of a manual transmission. The controller may be configured to, when in the control mode, change the torque of the electric motor according to a shift position selected with the pseudo H-shifter and an amount of operation of the accelerator pedal.

According to the battery electric vehicle of the present disclosure, the driver can select the control mode in which the operation of the pseudo shifting operation member imitating an operation member that is used to perform a shifting operation of a manual transmission internal combustion engine vehicle is associated with the torque of the electric motor. At this time, the restriction that can be removed or eased is imposed on the operation the battery electric vehicle performs in response to the operation of the pseudo shifting operation member. This allows even a driver who has not driven a manual transmission internal combustion engine vehicle for a long time and a driver who has no experience driving a manual transmission internal combustion engine vehicle to easily experience as if they were operating a manual transmission internal combustion engine vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Configuration of Power System of Battery Electric Vehicle

Figure 1:
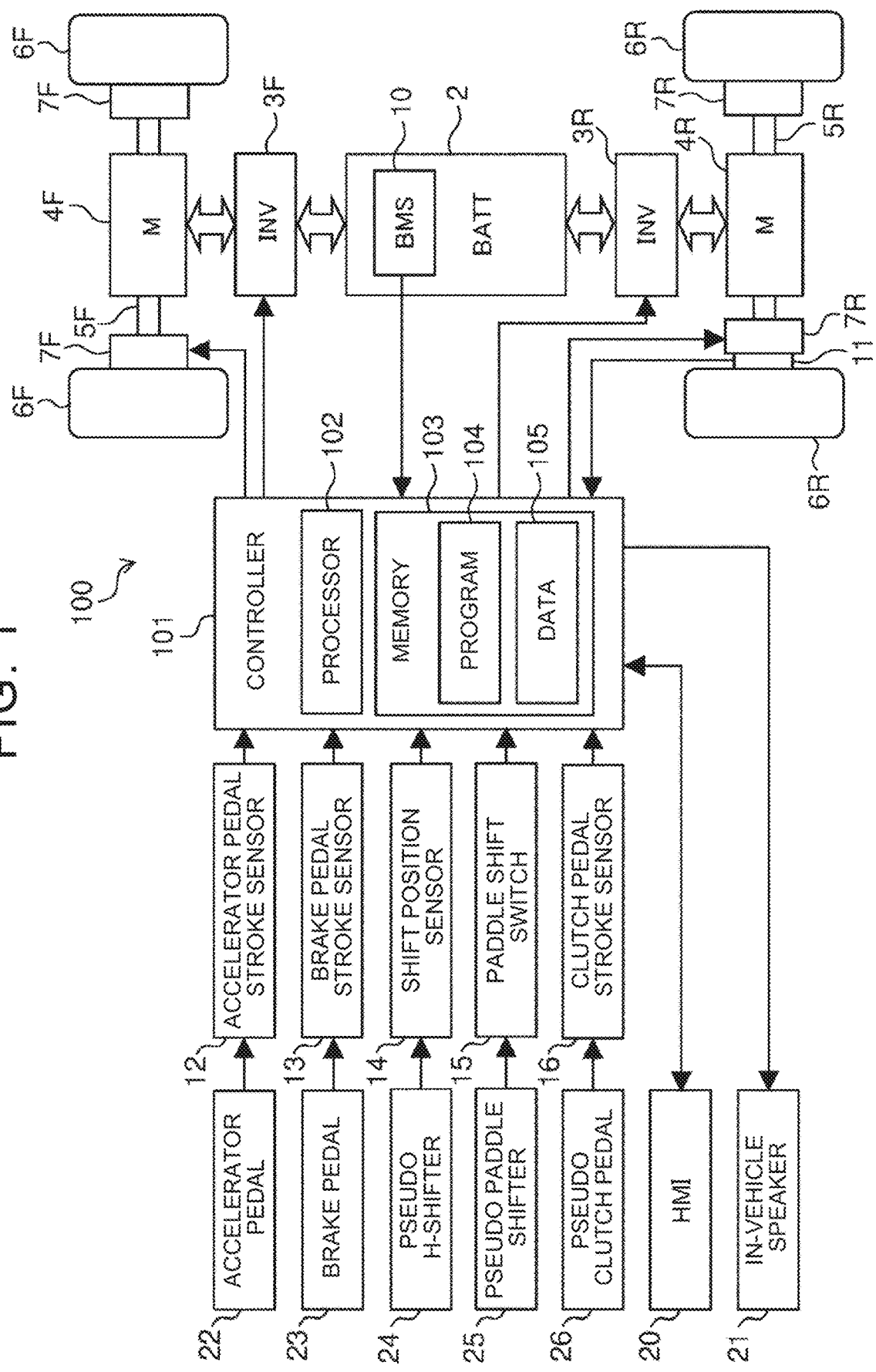
FIG. 1 shows the configuration of a battery electric vehicle according to an embodiment of the present disclosure.

FIG. 1 schematically shows the configuration of a battery electric vehicle 100 according to an embodiment of the present disclosure. First, the configuration of a power system of the battery electric vehicle 100 will be described with reference to FIG. 1.

The battery electric vehicle 100 includes two electric motors (M) 4F, 4R at the front and rear as traction power sources. The electric motors 4F, 4R are, for example, three-phase alternating current (AC) motors. The front electric motor 4F is connected to front drive shafts 5F that drive front wheels 6F. The rear electric motor 4R is connected to rear drive shafts 5R that drive rear wheels 6R. The front wheels 6F are suspended on electronically controlled right and left front suspensions 7F that are independent of each other. The rear wheels 6R are suspended on electronically controlled right and left rear suspensions 7R that are independent of each other.

The front electric motor 4F and the rear electric motor 4R are equipped with inverters (INVs) 3F, 3R, respectively. The front inverter 3F and the rear inverter 3R are each connected to a battery (BATT) 2. The battery 2 stores electrical energy for driving the electric motors 4F, 4R. That is, the battery electric vehicle 100 is a battery electric vehicle (BEV) that runs on the electrical energy stored in the battery 2. The inverters 3F, 3R are, for example, voltage inverters, and control the torque of the electric motors 4F, 4R, respectively, by pulse width modulation (PWM) control.

2. Configuration of Control System of Battery Electric Vehicle

Next, the configuration of a control system of the battery electric vehicle 100 will be described with reference to FIG. 1.

The battery electric vehicle 100 includes a battery management system (BMS) 10. The battery management system 10 is a device that monitors the cell voltage, current, temperature, etc. of the battery 2. The battery management system 10 has a function to estimate the state of charge (SOC) of the battery 2.

The battery electric vehicle 100 includes a vehicle speed sensor 11. At least one of wheel speed sensors, not shown, mounted on the right and left front wheels 6F and the right and left rear wheels 6R is used as the vehicle speed sensor 11. The battery electric vehicle 100 also includes an accelerator pedal stroke sensor 12. The accelerator pedal stroke sensor 12 is provided for an accelerator pedal 22, and outputs a signal indicating the amount of depression of the accelerator pedal 22, i.e., the accelerator operation amount. The battery electric vehicle 100 further includes a brake pedal stroke sensor 13. The brake pedal stroke sensor 13 is provided for a brake pedal 23, and outputs a signal indicating the amount of depression of the brake pedal 23, that is, the brake operation amount.

The accelerator pedal 22 and the brake pedal 23 are driving operation members that are used to drive the battery electric vehicle 100. In addition to these driving operation members, the battery electric vehicle 100 includes pseudo shifting operation members imitating operation members that are used to perform shifting operations of a manual transmission internal combustion engine vehicle. The pseudo shifting operation members include a pseudo H-shifter 24, a pseudo paddle shifter 25, and a pseudo clutch pedal 26, which will be described below.

The pseudo H-shifter 24 is a dummy different from a real H-shifter. The pseudo H-shifter 24 has a structure imitating a shift stick provided on a console, and is movable between shift positions along an H-pattern gate. Since the battery electric vehicle 100 does not have an actual transmission, the shift positions of the pseudo H-shifter 24 are virtual shift positions. The pseudo H-shifter 24 is provided with a shift position sensor 14. The shift position sensor 14 outputs a signal indicating the shift position selected by the pseudo H-shifter 24.

The pseudo paddle shifter 25 is a dummy different from a real paddle shifter that is a type of sequential shifter. The pseudo paddle shifter 25 has a structure imitating shift paddles attached to a steering wheel, and includes right and left paddles that can be moved independently of each other. The pseudo paddle shifter 25 is provided with a paddle shift switch 15. The paddle shift switch 15 outputs an upshift signal when the right paddle is pulled, and outputs a downshift signal when the left paddle is pulled.

The pseudo clutch pedal 26 is a dummy different from a real clutch pedal. The pseudo clutch pedal 26 has a structure imitating a clutch pedal of a conventional manual transmission internal combustion engine vehicle. For example, the pseudo clutch pedal 26 includes a reaction force mechanism that generates a reaction force in response to depression of the pseudo clutch pedal 26 by a driver. A start position of the pseudo clutch pedal 26 is a position when no depressing force is applied to the pseudo clutch pedal 26, and an end position of the pseudo clutch pedal 26 is a position when the pseudo clutch pedal 26 is depressed all the way down. The driver can operate the pseudo clutch pedal 26 from the start position to the end position against the reaction force from the reaction force mechanism. The pseudo clutch pedal 26 is provided with a clutch pedal stroke sensor 16. The clutch pedal stroke sensor 16 outputs a signal indicating the amount of depression of the pseudo clutch pedal 26. Since the battery electric vehicle 100 does not have an actual clutch, the amount of operation of the pseudo clutch pedal 26, that is, the clutch operation amount, is a virtual clutch operation amount.

Although the pseudo clutch pedal 26 is a pedal-type operation device that is operated by foot, a lever-type or dial-type operation device that is operated by hand may be provided as a pseudo clutch operation device. The pseudo clutch operation device may have various structures as long as the driver can operate the pseudo clutch operation device from its start position to its end position against the reaction force and can experience an operation feel like a clutch pedal of a conventional manual transmission internal combustion engine vehicle with his or her foot or hand.

The battery electric vehicle 100 further includes a human-machine interface (HMI) 20 as an interface with the driver, and an in-vehicle speaker 21. The HMI 20 includes a touch panel display. The HMI 20 displays information on the touch panel display, and receives inputs from the driver through touch operations on the touch panel display. The in-vehicle speaker 21 can provide information to the driver by voice, and can also output a pseudo engine sound described later.

The battery electric vehicle 100 includes a controller 101. Sensors and devices to be controlled that are mounted on the battery electric vehicle 100 are connected to the controller 101 via an in-vehicle network. In addition to the battery management system 10, the vehicle speed sensor 11, the accelerator pedal stroke sensor 12, the brake pedal stroke sensor 13, the shift position sensor 14, the paddle shift switch 15, and the clutch pedal stroke sensor 16, various other sensors are mounted on the battery electric vehicle 100.

The controller 101 is typically an electronic control unit (ECU). The controller 101 may be a combination of a plurality of ECUs. The controller 101 includes at least a processor 102 and a memory 103. The memory 103 includes a random access memory (RAM) for temporarily recording data and a read-only memory (ROM) for storing a program 104 that is executable by the processor 102 and various types of data 105 related to the program. The program 104 is composed of a plurality of instructions. The processor 102 reads the program 104 and the data 105 from the memory 103, executes the program 104, and generates control signals based on signals acquired from the sensors. The controller 101 may include one processor 102, or may include a plurality of processors 102.

The controller 101 can control the battery electric vehicle 100 in various control modes. The driver can select a control mode himself or herself by performing a touch operation on the touch panel display of the HMI 20. Specifically, when a touch operation is performed on the touch panel display of the HMI 20, one or more programs 104 associated with that touch operation are read from the memory 103 and executed by the processor 102. The control modes of the battery electric vehicle 100 by the controller 101 that can be selected by the driver through an operation on the HMI 20 will be described below.

3. Control Modes of Battery Electric Vehicle

Figure 2:
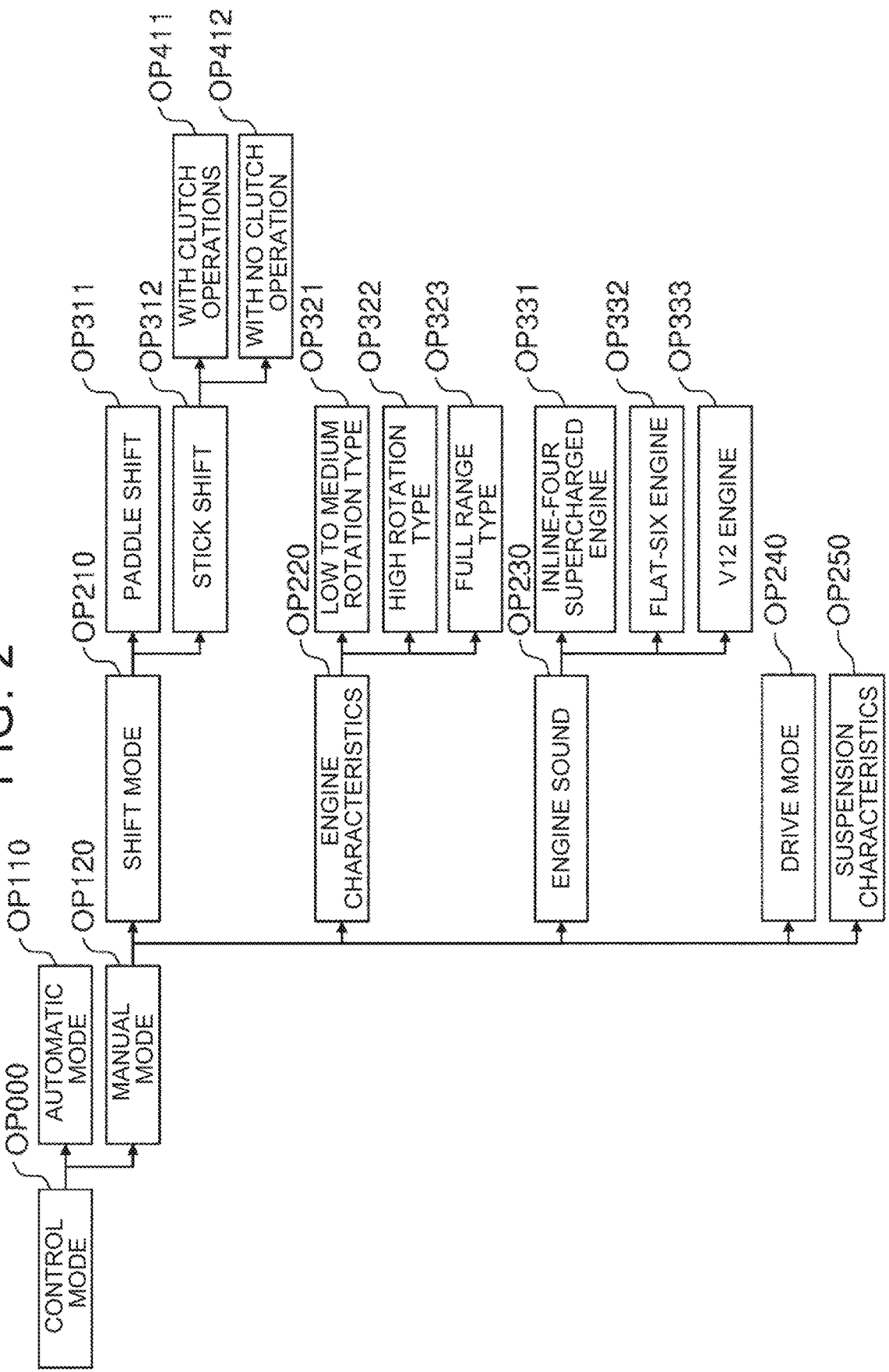
FIG. 2 is a tree diagram showing an example of control modes of the battery electric vehicle that can be selected by a controller.
Figure 3:
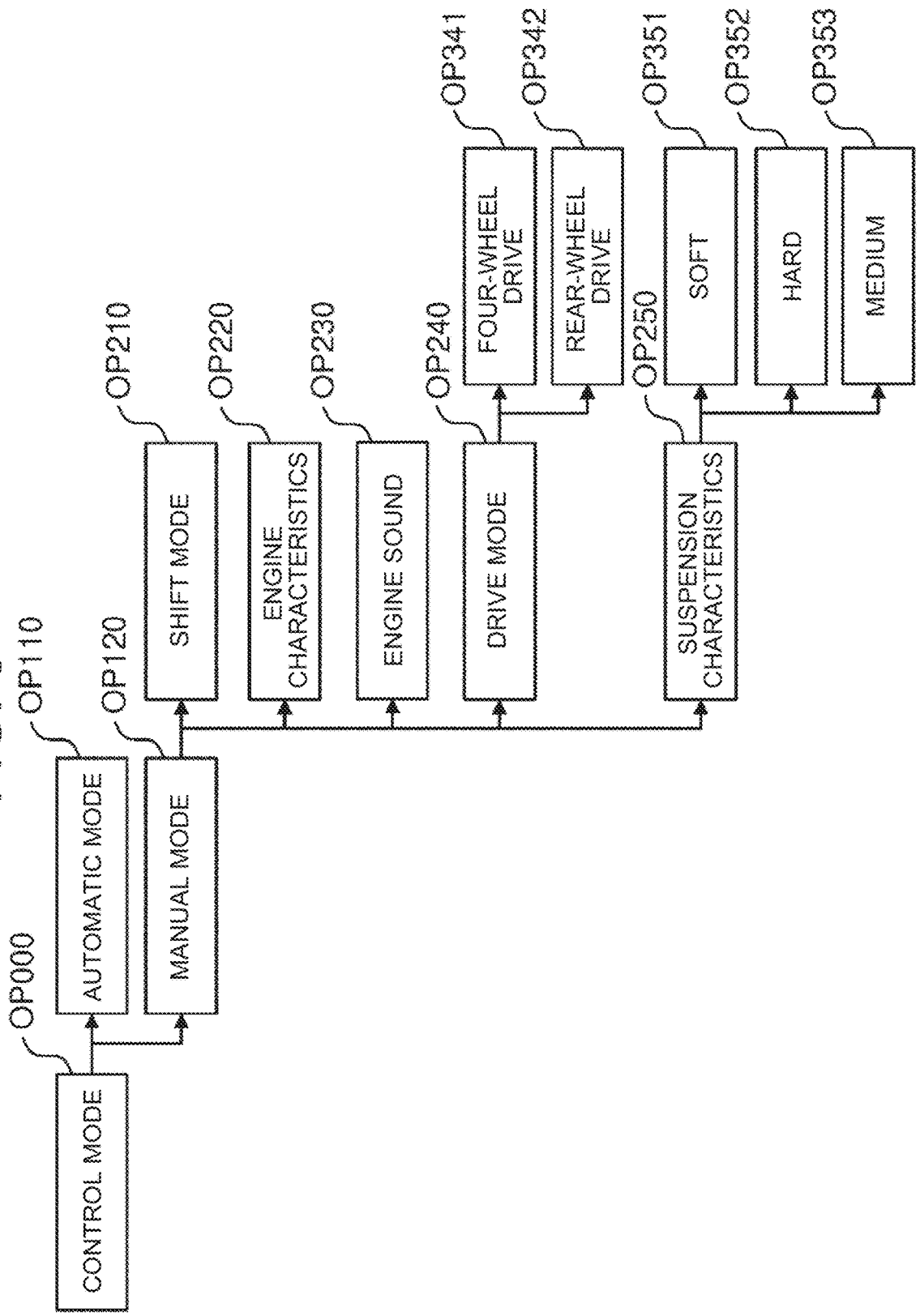
FIG. 3 is a tree diagram showing an example of the control modes of the battery electric vehicle that can be selected by the controller.

FIGS. 2 and 3 are tree diagrams showing an example of the control modes of the battery electric vehicle 100 that can be selected by the controller 101. A selection screen is displayed on the touch panel display of the HMI 20 according to the control tree shown in FIG. 2.

An option "control mode" OP000 is displayed on the initial screen of the HMI 20. When the option "control mode" OP000 is selected, options "automatic mode" OP110 and "manual mode" OP120 are displayed on the touch panel display. When the option "automatic mode" OP110 is selected, the control mode of the battery electric vehicle 100 is switched to an automatic mode. The automatic mode is a control mode in which the battery electric vehicle 100 is driven as a normal BEV. In the automatic mode, the driver can basically drive the battery electric vehicle 100 only by operating the accelerator pedal 22, the brake pedal 23, and the steering wheel, not shown. In the automatic mode, shift operations of the pseudo H-shifter 24, shift operations of the pseudo paddle shifter 25, and clutch operations of the pseudo clutch pedal 26 are disabled.

When the option "manual mode" OP120 is selected, the control mode of the battery electric vehicle 100 is switched to a manual mode. The manual mode is a control mode in which the battery electric vehicle 100 is operated like a manual transmission internal combustion engine vehicle. When the option "manual mode" OP120 is selected, options "shift mode" OP210, "engine characteristics" OP220, "engine sound" OP230, "drive mode" OP240, and "suspension characteristics" OP250 are displayed on the touch panel display. By combining the options OP210 to OP250 as desired, the driver can determine the characteristics of a manual transmission internal combustion engine vehicle that he or she wants the battery electric vehicle 100 to simulate.

The option "shift mode" OP210 is an option to select a shift mode of a manual transmission when the battery electric vehicle 100 is to be operated like a manual transmission internal combustion engine vehicle. As shown in FIG. 2, when the option "shift mode" OP210 is selected, options "paddle shift" OP311 and "stick shift" OP312 are displayed on the touch panel display. When the option "paddle shift" OP311 is selected, the shift mode of the manual transmission to be replicated by the battery electric vehicle 100 is switched to a paddle shift mode. The paddle shift mode is a mode in which the pseudo paddle shifter 25 is used for shift operations. In the paddle shift mode, shift operations of the pseudo H-shifter 24 are disabled. In the paddle shift mode, the operation when the gear ratio of the manual transmission is changed is replicated by a shift operation of the pseudo paddle shifter 25. Clutch operations in a real paddle-shift manual transmission are automatically performed by a robot. Therefore, no clutch operations of the pseudo clutch pedal 26 are required in the paddle shift mode. In the paddle shift mode, clutch operations of the pseudo clutch pedal 26 are disabled.

When the option "stick shift" OP312 is selected, a stick shift mode is selected. The stick shift mode is a mode in which the pseudo H-shifter 24 is used for shift operations. In the stick shift mode, shift operations of the pseudo paddle shifter 25 are disabled. In the stick shift mode, the operation when the gear ratio of the manual transmission is changed is replicated by a shift operation of the pseudo H-shifter 24. Some real H-shifter manual transmissions allow the driver to perform clutch operations while others leave clutch operations to a robot. When the option "stick shift" OP312 is selected, options "with clutch operations" OP411 and "with no clutch operation" OP412 are displayed on the touch panel display. When the option "with clutch operations" OP411 is selected, the stick shift mode is switched to a mode that requires clutch operations of the pseudo clutch pedal 26. On the other hand, when the option "with no clutch operation" OP412 is selected, clutch operations of the pseudo clutch pedal 26 are disabled, and the stick shift mode is switched to a mode that does not require clutch operations of the pseudo clutch pedal 26.

The option "engine characteristics" OP220 is an option to select characteristics of an internal combustion engine when the battery electric vehicle 100 is to be operated like a manual transmission internal combustion engine vehicle. As shown in FIG. 2, when the option "engine characteristics" OP220 is selected, options "low to medium rotation type" OP321, "high rotation type" OP322, and "full range type" OP323 are displayed on the touch panel display. When the option "low to medium rotation type" OP321 is selected, the characteristics of the internal combustion engine to be replicated by the battery electric vehicle 100 are switched to a low to medium rotation type in which the torque in a low to medium rotation range is relatively high. When the option "high rotation type" OP322 is selected, the characteristics of the internal combustion engine to be replicated by the battery electric vehicle 100 are switched to a high rotation type in which the torque in a high rotation range is relatively high. When the option "full range type" OP323 is selected, the characteristics of the internal combustion engine to be replicated by the battery electric vehicle 100 are switched to a full range type in which the torque is uniform in the entire rotation range. Note that the low to medium rotation type, the high rotation type, and the full range type are merely examples of the engine characteristics that can be replicated by control of the battery electric vehicle 100.

The option "engine sound" OP230 is an option to select an engine sound to be replicated by the battery electric vehicle 100. As shown in FIG. 2, when the option "engine sound" OP230 is selected, options "inline-four supercharged engine" OP331, "flat-six engine" OP332, and "V12 engine" OP333 are displayed on the touch panel display. When the option "inline-four supercharged engine" OP331 is selected, the engine sound to be replicated by the battery electric vehicle 100 is switched to an engine sound of an inline-four supercharged engine. When the option "flat-six engine" OP332 is selected, the engine sound to be replicated by the battery electric vehicle 100 is switched to an engine sound of a flat-six engine. When the option "V12 engine" OP333 is selected, the engine sound to be replicated by the battery electric vehicle 100 is switched to an engine sound of a V12 engine. Note that the inline-four supercharged engine, the flat-six engine, and the V12 engine are merely examples of the engine sound that can be replicated by the battery electric vehicle 100.

The option "drive mode" OP240 is an option to select a drive mode of the battery electric vehicle 100. As shown in FIG. 3, when the option "drive mode" OP240 is selected, options "four-wheel drive" OP341 and "rear-wheel drive" OP342 are displayed on the touch panel display. When the option "four-wheel drive" OP341 is selected, the drive mode of the battery electric vehicle 100 is switched to a four-wheel drive mode. In the four-wheel drive mode, the front wheels 6F are driven by the front electric motor 4F, and the rear wheels 6R are driven by the rear electric motor 4R. Torque distribution between the front wheels 6F and the rear wheels 6R can be fixed or made variable by controlling the electric motors 4F, 4F by the inverters 3F, 3R. When the option "rear-wheel drive" OP342 is selected, the drive mode of the battery electric vehicle 100 is switched to a rear-wheel drive mode. In the rear-wheel drive mode, only the rear wheels 6R are driven by the rear electric motor 4R. The drive mode of the battery electric vehicle 100 may include an option of a front-wheel drive mode in which only the front wheels 6F are driven by the front electric motor 4F, instead of or in addition to the rear-wheel drive mode.

The option "suspension characteristics" OP250 is an option to select suspension characteristics of the battery electric vehicle 100. As shown in FIG. 3, when the option "suspension characteristics" OP250 is selected, options "soft" OP351, "hard" OP352, and "medium" OP353 are displayed on the touch panel display. When the option "soft" OP351 is selected, the suspension characteristics of the battery electric vehicle 100 are switched to a soft mode. In the soft mode, damping forces of the suspensions 7F, 7R are reduced. When the option "hard" OP352 is selected, the suspension characteristics of the battery electric vehicle 100 are switched to a hard mode. In the hard mode, the damping forces of the suspensions 7F, 7R are increased. When the option "medium" OP353 is selected, the suspension characteristics of the battery electric vehicle 100 are switched to a medium mode. In the medium mode, the damping forces of the suspensions 7F, 7R are set to an intermediate value between the value in the soft mode and the value in the hard mode. Since the suspensions 7F, 7R are electronically controlled suspensions, the suspension characteristics of the suspensions 7F, 7R can be adjusted in a wide range. Therefore, the soft mode, the hard mode, and the medium mode are merely examples of the suspension characteristics that can be implemented in the battery electric vehicle 100. The drive mode and the suspension characteristics may be selectable not only in the manual mode but also in the automatic mode.

The driver can switch the control mode of the battery electric vehicle 100 to his or her preference by operating the touch panel display of the HMI 20 according to the control tree described above. The switchable control modes include modes related to driving control of the battery electric vehicle 100 and modes related to sound control of the battery electric vehicle 100. Specifically, the modes related to the option "engine sound" OP230 are the modes related to sound control, and the remaining modes are the modes related to driving control. In the following sections, the driving control and sound control of the battery electric vehicle 100 by the controller 101 will be described.

4. Driving Control of Battery Electric Vehicle

Figure 4:
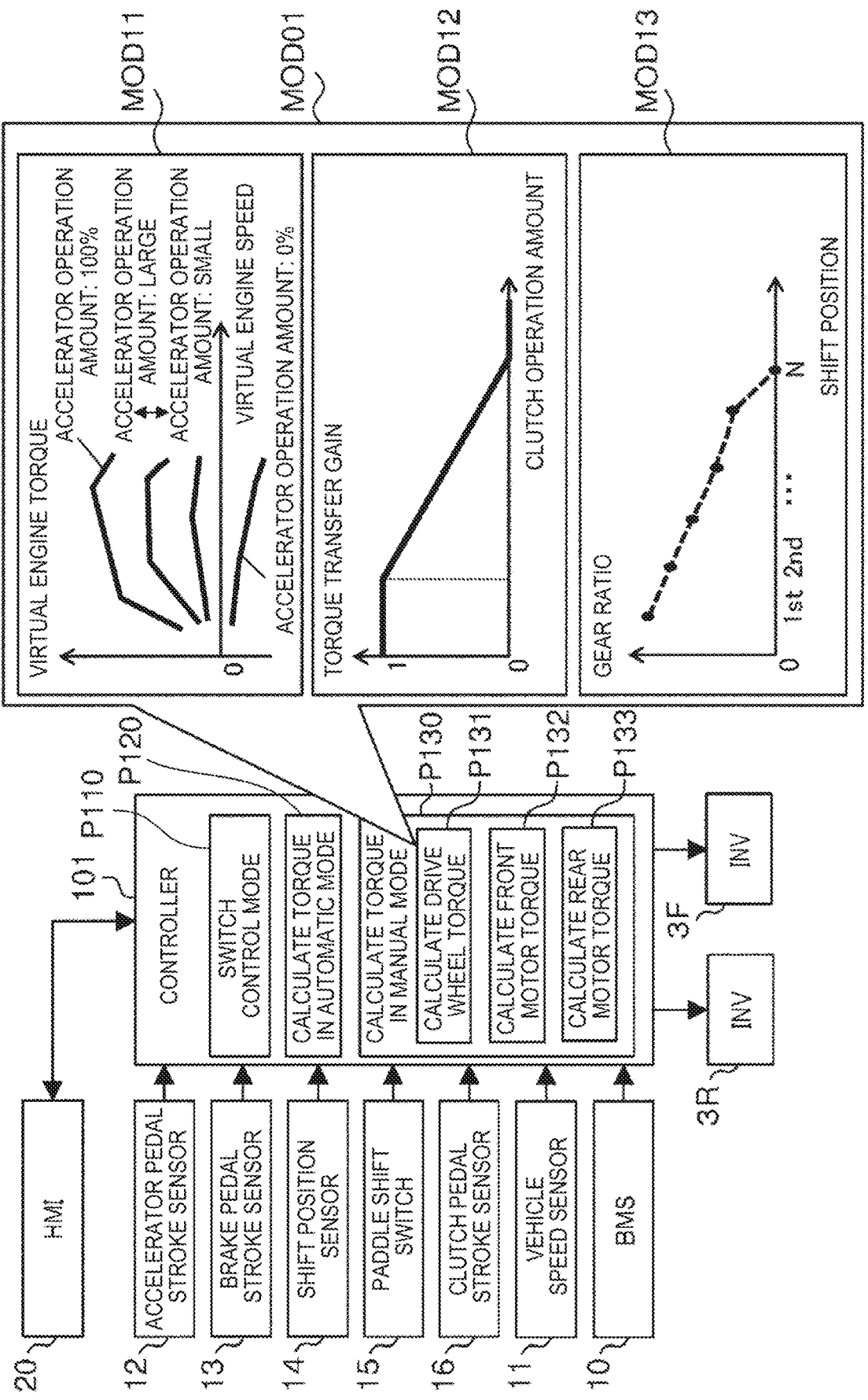
FIG. 4 shows the configuration of the controller related to driving control of the battery electric vehicle.

FIG. 4 shows the configuration of the controller 101 related to the driving control of the battery electric vehicle 100. Specifically, FIG. 4 shows a configuration related particularly to torque control out of the driving control. The processor 102 functions as a driving control device when the processor 102 executes one or more driving control programs 104 stored in the memory 103.

A control mode signal is input from the HMI 20 to the controller 101 that functions as a driving control device. The control mode signal includes information about the control mode selected by the driver. The controller 101 performs a process P110 based on the control mode signal. In the process P110, the control mode is switched according to the control mode signal. Switching of the control mode that particularly affects the driving control is switching between the automatic mode and the manual mode.

When the control mode is switched to the automatic mode, the controller 101 performs a process P120 of calculating torque in the automatic mode. In the process P120, the controller 101 acquires a vehicle speed from a signal from the vehicle speed sensor 11, and acquires an accelerator operation amount from a signal from the accelerator pedal stroke sensor 12. The controller 101 has a motor torque map that uses an accelerator operation amount and a vehicle speed as parameters. The controller 101 inputs the acquired vehicle speed and accelerator operation amount to the motor torque map, and controls the inverters 3F, 3R so as to cause the electric motors 4F, 4R to generate the torque obtained from the motor torque map.

When the control mode is switched to the manual mode, the controller 101 performs a process P130 of calculating torque in the manual mode. The process P130 includes a process P131 of calculating torque to be generated by drive wheels. The process P130 also includes a process P132 and a process P133. The process P132 is a process of calculating torque to be generated by the front electric motor 4F, and the process P133 is a process of calculating torque to be generated by the rear electric motor 4R. The processes P132, P133 are performed according to the drive wheel torque calculated in the process P130 and the torque distribution between the front wheels 6F and the rear wheels 6R.

A vehicle model MOD01 is used to calculate the drive wheel torque in the process P131. The vehicle model MOD01 includes an engine model MOD11, a clutch model MOD12, and a transmission model MOD13. An engine virtually implemented by the vehicle model MOD01 will be referred to as "virtual engine," a clutch virtually implemented by the vehicle model MOD01 will be referred to as "virtual clutch," and a transmission virtually implemented by the vehicle model MOD01 will be referred to as "virtual transmission." The engine model MOD11 models the virtual engine. The clutch model MOD12 models the virtual clutch. The transmission model MOD13 models the virtual transmission.

The engine model MOD11 calculates a virtual engine speed and virtual engine torque. The virtual engine speed is calculated from the vehicle speed, the overall reduction ratio, and the slip ratio of the virtual clutch. The virtual engine torque is calculated from the virtual engine speed and the accelerator operation amount. The vehicle speed is acquired from a signal from the vehicle speed sensor 11. The accelerator operation amount is acquired from a signal from the accelerator pedal stroke sensor 12. The overall reduction ratio is a numerical value obtained by multiplying the gear ratio of the virtual transmission by the reduction ratio determined by the mechanical structure from the virtual transmission to the drive wheels. The engine model MOD11 defines the relationship between the virtual engine speed and the virtual engine torque for each accelerator operation amount. The driver can select engine characteristics of the engine model MOD11 by operating the HMI 20. In the example shown in FIG. 2, the engine characteristics can be selected from the low to medium rotation type, the high rotation type, and the full range type.

The clutch model MOD12 calculates a torque transfer gain. The torque transfer gain is a gain for calculating the degree of torque transfer of the virtual clutch according to the clutch operation amount. When the stick shift mode with clutch operations is selected as the shift mode, the clutch operation amount is acquired from a signal from the clutch pedal stroke sensor 16. The clutch operation amount is 0% at the start position of the pseudo clutch pedal 26 and is 100% at the end position of the pseudo clutch pedal 26. The clutch model MOD12 gives the torque transfer gain with respect to the clutch operation amount. The torque transfer gain is converted to the clutch torque capacity of the virtual clutch, i.e., the virtual clutch torque capacity. Virtual clutch torque that is input from the virtual clutch to the virtual transmission is calculated based on a comparison between the virtual clutch torque capacity and the virtual engine torque calculated by the engine model MOD11. The clutch model MOD12 calculates the slip ratio by subtracting the torque transfer gain from 1. The slip ratio is used to calculate the virtual engine speed in the engine model MOD11.

When the paddle shift mode is selected as the shift mode, the clutch operation amount to be input to the clutch model MOD12 is calculated using a clutch operation model. When the stick shift mode with no clutch operation is selected as the shift mode, the clutch operation amount to be input to the clutch model MOD12 is calculated using the clutch operation model. The clutch operation model is a model that simulates clutch operations by a model driver. When the paddle shift mode is selected, the vehicle speed, the virtual engine speed, and a signal from the paddle shift switch 15 are input to the clutch operation model. When the stick shift mode with no clutch operation is selected, the vehicle speed, the virtual engine speed, and a signal from the shift position sensor 14 are input to the clutch operation model.

The signal from the paddle shift switch 15 and the signal from the shift position sensor 14 are used to determine the timing of a clutch operation. When a shift operation by the driver is detected based on the signal from the paddle shift switch 15 or the signal from the shift position sensor 14, the clutch operation model maximizes the clutch opening amount to disengage the virtual clutch. The vehicle speed and the virtual engine speed are used to calculate the clutch operation amount. The clutch operation model calculates the clutch operation amount based on the difference between the rotational speed of an input shaft of the virtual transmission calculated from the vehicle speed and the virtual engine speed, so as to smoothly match the rotational speed of the input shaft of the virtual transmission with the virtual engine speed.

The transmission model MOD13 calculates a virtual gear ratio. The virtual gear ratio is a gear ratio determined by the virtual shift position of the virtual transmission. The virtual gear ratio is set for each shift position. The highest virtual gear ratio is set for first gear, followed by second gear, third gear, fourth gear, . . . in descending order. In the stick shift mode, the shift positions are in one-to-one correspondence with signals from the shift position sensor 14. In the paddle shift mode, the shift position is shifted up by one gear in response to an upshift signal from the paddle shift switch 15, and the shift position is shifted down by one gear in response to a downshift signal from the paddle shift switch 15. While the number of shift positions of the pseudo H-shifter 24 is physically determined, there is no physical limit on the number of shift positions of the pseudo paddle shifter 25. Therefore, the transmission model MOD13 may be set differently between the stick shift mode and the paddle shift mode so that the number of shift positions in the paddle shift mode is larger than the number of shift positions in the stick shift mode.

The transmission model MOD13 calculates virtual transmission torque using the virtual gear ratio and the virtual clutch torque. The virtual transmission torque is virtual torque output from the virtual transmission. The controller 101 controls the inverters 3F, 3R so as to change the output torques of the electric motors 4F, 4R according to the virtual transmission torque. The virtual transmission torque changes discontinuously in response to a change in virtual gear ratio. Such a discontinuous change in virtual transmission torque causes torque shock in the battery electric vehicle 100, creating a feel of a vehicle with a stepped transmission.

The vehicle model MOD01 calculates the drive wheel torque from the virtual transmission torque and the reduction ratio. When the four-wheel drive mode is selected as the drive mode, the drive wheel torque is the sum of torques applied to the right and left front wheels 6F and the right and left rear wheels 6R. The torque distribution between the front wheels 6F and the rear wheels 6R may be fixed, or may be actively or passively varied. When the rear-wheel drive mode is selected as the drive mode, the drive wheel torque is the sum of torques applied to the right and left rear wheels 6R.

In the process P132, the torque of the front electric motor 4F (front motor torque) in the manual mode is calculated by multiplying the drive wheel torque calculated in the process P131 by the torque distribution rate to the front wheels 6F and the reduction ratio from an output shaft of the front electric motor 4F to the front wheels 6F. The controller 101 controls the front inverter 3F so as to cause the front electric motor 4F to generate the front motor torque calculated in the process P132.

In the process P133, the torque of the rear electric motor 4R (rear motor torque) in the manual mode is calculated by multiplying the drive wheel torque calculated in the process P131 by the torque distribution rate to the rear wheels 6R and the reduction ratio from an output shaft of the rear electric motor 4R to the rear wheels 6R. The controller 101 controls the rear inverter 3R so as to cause the rear electric motor 4R to generate the rear motor torque calculated in the process P133.

In the configuration shown in FIG. 4, the battery management system 10 and the brake pedal stroke sensor 13 are not necessarily required for the driving control described above. However, when switching of the control mode affects the SOC of the battery 2, a signal from the battery management system 10 may be used as information for determining whether to allow switching of the control mode. In the case where the method of operating the battery electric vehicle 100 changes significantly such as when the control mode is switched between the automatic mode and the manual mode, the condition for switching the control mode may be that the brake pedal 23 is being depressed. In that case, a signal from the brake pedal stroke sensor 13 can be used as information for determining whether the brake pedal 23 is being depressed.

5. Sound Control of Battery Electric Vehicle

Figure 5:
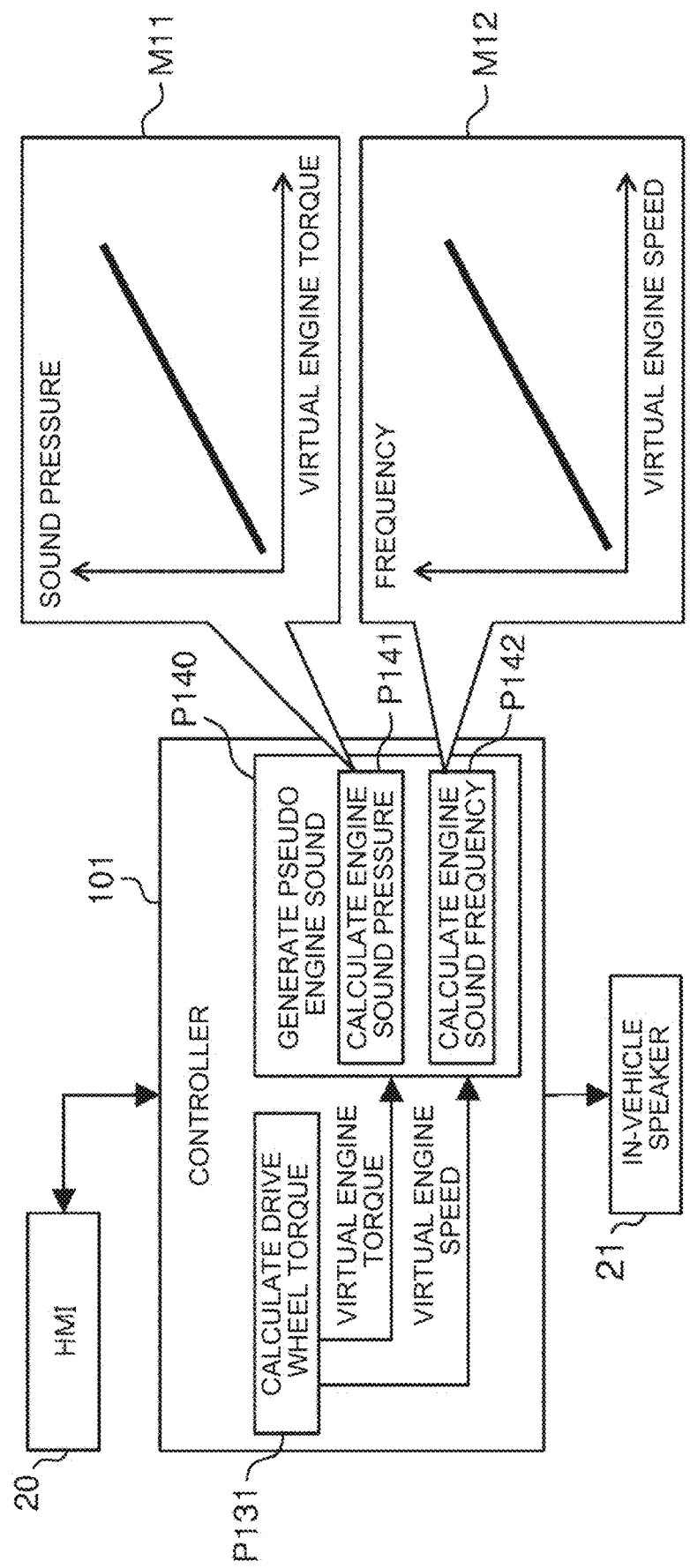
FIG. 5 shows the configuration of the controller related to sound control of the battery electric vehicle.

FIG. 5 shows the configuration of the controller 101 related to the sound control of the battery electric vehicle 100. The processor 102 functions as a sound control device when the processor 102 executes one or more sound control programs 104 stored in the memory 103. The processor 102 functioning as a driving control device and the processor 102 functioning as a sound control device may be different processors, or may be the same processor.

The controller 101 functioning as a sound control device can output artificially generated sounds from the in-vehicle speaker 21. One of such artificial sounds is a pseudo engine sound that imitates an engine sound of a conventional internal combustion engine vehicle. When a control mode signal indicating that the manual mode has been selected is received from the HMI 20, the controller 101 functioning as a sound control device performs a process P140. In the process P140, a pseudo engine sound is generated based on the virtual engine torque and virtual engine speed calculated in the process P131.

In the process P140, an engine sound selected via the HMI 20 is used as a sound source of the pseudo engine sound to be generated from the in-vehicle speaker 21. In the example shown in FIG. 2, an engine sound selected from the inline-four supercharged engine, the flat-six engine, and the V12 engine is used as a sound source of the pseudo engine sound. However, in the process P140, the sound from the sound source is not used as it is. In the process P140, the sound pressure of the sound source is changed by, for example, an amplifier, and the frequency of the sound source is changed by, for example, a frequency modulator.

The process P140 includes a process P141 of calculating an engine sound pressure and a process P142 of calculating an engine sound frequency. In the process P141, the sound pressure of the pseudo engine sound is calculated from the virtual engine torque using a sound pressure map M11. The sound pressure map M11 is created so that the sound pressure increases as the virtual engine torque increases. In the process P142, the frequency of the pseudo engine sound is calculated from the virtual engine speed using a frequency map M12. The frequency map M12 is created so that the frequency increases as the virtual engine speed increases. The virtual engine torque and the virtual engine speed change according to the driver's accelerator operation, shift operation, and clutch operation. Changing the sound pressure and frequency of the pseudo engine sound according to the virtual engine torque and virtual engine speed that change in this manner can give the driver a feel as if he or she were actually driving a real manual transmission internal combustion engine vehicle.

6. Training Mode

6-1. Overview

By switching the control mode to the manual mode via the HMI 20, the driver of the battery electric vehicle 100 can experience as if he or she were operating a manual transmission internal combustion engine vehicle while driving the battery electric vehicle 100. However, for a driver who has not driven a manual transmission internal combustion engine vehicle for a long time and a driver who has no experience driving a manual transmission internal combustion engine vehicle, operating a manual transmission internal combustion engine vehicle is not easy and driving may not be enjoyable.

Therefore, the manual mode imposes restrictions on the operations the battery electric vehicle 100 performs in response to shift operations and clutch operations that are operations unique to manual transmission internal combustion engine vehicles. This allows the driver to experience easily and at ease as if he or she were operating a manual transmission internal combustion engine vehicle. The restrictions imposed on the operations of the battery electric vehicle 100 in the manual mode can be removed when the driver meets predetermined conditions that indicate that the driver's operating skills must have been improved.

In order to improve the driver's operating skills, the battery electric vehicle 100 has training modes suitable for training in operating a manual transmission internal combustion engine vehicle. Removing the restrictions as a result of training in the training mode allows the battery electric vehicle 100 to replicate the operations a manual transmission internal combustion engine vehicle is supposed to perform in response to shift operations and clutch operations. The driver who has become proficient in performing shift operations and clutch operations can more enjoy the feel of a manual transmission internal combustion engine vehicle while driving the battery electric vehicle 100.

6-2. Specific Details

Figure 6:
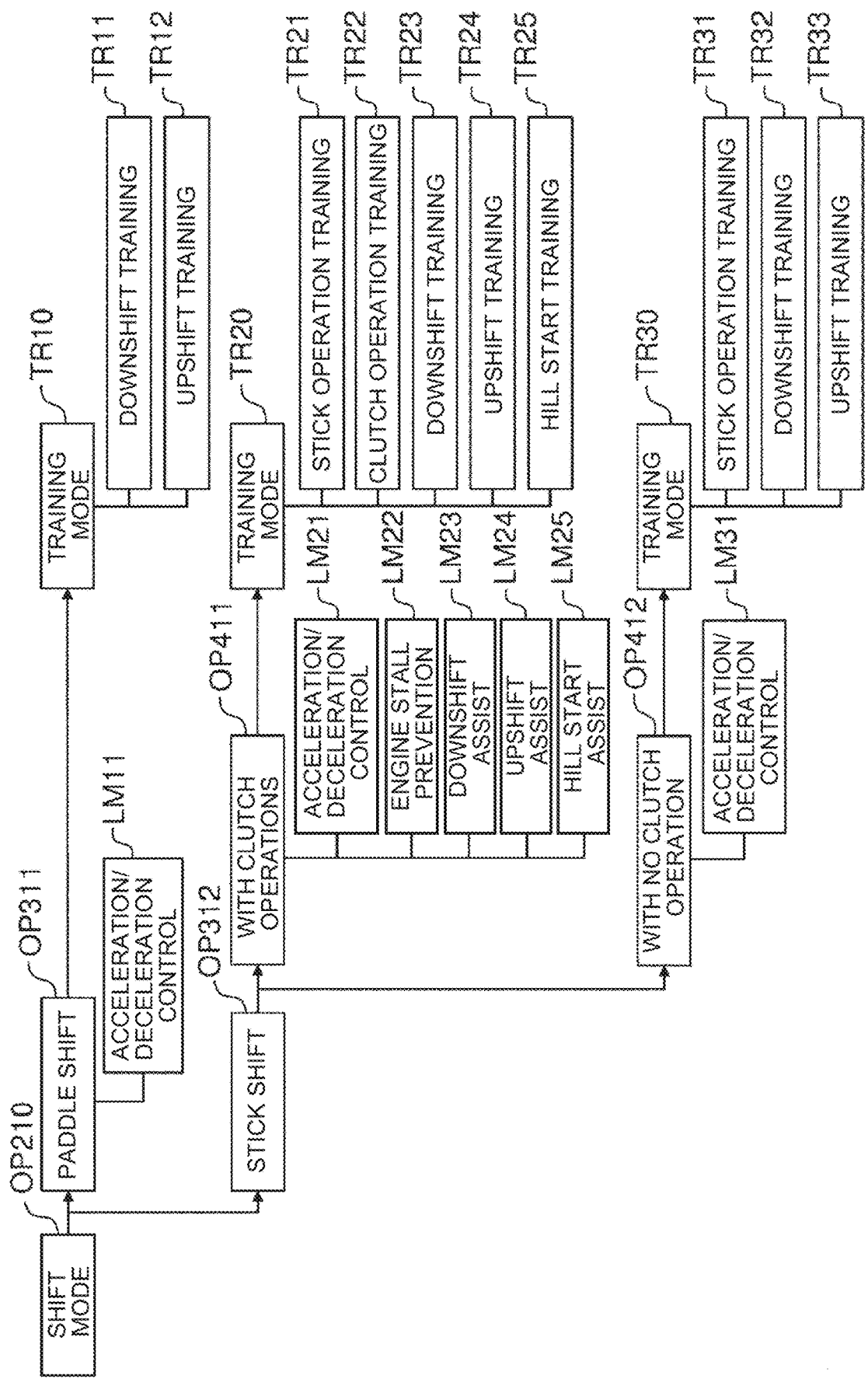
FIG. 6 is a tree diagram showing functions to restrict the operation of the battery electric vehicle in a manual mode and training modes corresponding to the functions.

FIG. 6 is a tree diagram showing functions to restrict the operation of the battery electric vehicle 100 during driving in the manual mode and training modes corresponding to the functions. According to FIG. 6, when the option "paddle shift" OP311 is selected on the touch panel display of the HMI 20, acceleration/deceleration control LM11 is enabled as a function to restrict the operation of the battery electric vehicle 100. The acceleration/deceleration control LM11 is a function to restrain the battery electric vehicle 100 from suddenly accelerating or decelerating when a driver who is not used to a paddle shifter performs an inappropriate shift operation. Enabling the acceleration/deceleration control LM11 allows the driver to enjoy performing shift operations with the pseudo paddle shifter 25 at ease. The acceleration/deceleration control LM11 that has been enabled can be disabled when predetermined conditions are met.

A training mode TR10 is prepared for the option "paddle shift" OP311. When the driver selects the training mode TR10 on the touch panel display of the HMI 20, the controller 101 executes a downshift training TR11 and an upshift training TR12. The downshift training TR11 is a training to figure out the timing to perform a downshift by operating the pseudo paddle shifter 25. The upshift training TR12 is a training to figure out the timing to perform an upshift by operating the pseudo paddle shifter 25.

When the option "stick shift" OP312 is selected and the option "with clutch operations" OP411 is then selected, acceleration/deceleration control LM21, engine stall prevention LM22, downshift assist LM23, upshift assist LM24, and hill start assist LM25 are enabled as functions to restrict the operation of the battery electric vehicle 100. The acceleration/deceleration control LM21 is a function to restrain the battery electric vehicle 100 from suddenly accelerating or decelerating when a driver who is not used to an H-shifter performs an inappropriate shift operation. The engine stall prevention LM22 is a function to turn off a simulated engine stall of the battery electric vehicle 100 to allow even a driver who is not used to operating a clutch pedal to perform clutch operations at ease. The simulated engine stall is a function to simulate an engine stall resulting from an inappropriate clutch operation by causing torque shock in the electric motors 4F, 4R. The downshift assist LM23 is a function to reduce shift shock by increasing the virtual engine speed when downshifting. The upshift assist LM24 is a function to reduce shift shock by reducing the virtual engine speed when upshifting. The hill start assist LM25 is a function to restrain the vehicle from rolling back due to a delay in performing an accelerator operation or clutch operation when starting on a hill. Enabling these restriction functions allows the driver to enjoy performing shift operations with the pseudo H-shifter 24 and clutch operations with the pseudo clutch pedal 26 at ease. Even after these restriction functions are enabled, they can be disabled when predetermined conditions are met.

A training mode TR20 is prepared for the option "with clutch operations" OP411. When the driver selects the training mode TR20, the controller 101 executes a stick operation training TR21, a clutch operation training TR22, a downshift training TR23, an upshift training TR24, and a hill start training TR25. The stick operation training TR21 is a training to quickly move a stick of the pseudo H-shifter 24 to a correct position. The clutch operation training TR22 is a training to learn to use half clutch by operating the pseudo clutch pedal 26. The downshift training TR23 is a training to increase the virtual engine speed to an appropriate speed by performing an accelerator operation when downshifting. The upshift training TR24 is a training to quickly engaging the virtual clutch by operating the pseudo clutch pedal 26 when upshifting. The hill start training TR25 is a training to operate the accelerator pedal 22 and the pseudo clutch pedal 26 cooperatively so as not to cause the vehicle to roll back when starting on a hill.

When the option "stick shift" OP312 is selected and the option "with no clutch operation" OP412 is then selected, acceleration/deceleration control LM31 is enabled as a function to restrict the operation of the battery electric vehicle 100. The acceleration/deceleration control LM31 is a function to restrain the battery electric vehicle 100 from suddenly accelerating or decelerating when a driver who is not used to an H-shifter performs an inappropriate shift operation. Enabling the acceleration/deceleration control LM31 allows the driver to enjoy performing shift operations with the pseudo H-shifter 24 at ease. The acceleration/deceleration control LM31 that has been enabled can be disabled when predetermined conditions are met.

A training mode TR30 is prepared for the option "with no clutch operation" OP412. When the driver selects the training mode TR30, the controller 101 executes a stick operation training TR31, a downshift training TR32, and an upshift training TR33. The stick operation training TR31 is a training to move the stick of the pseudo H-shifter 24 to a correct position. The downshift training TR32 is a training to increase the virtual engine speed to an appropriate speed by performing an accelerator operation when downshifting. The upshift training TR33 is a training to quickly engage the virtual clutch by operating the pseudo clutch pedal 26 when upshifting.

6-3. Method for Setting Training Mode

Figure 7:
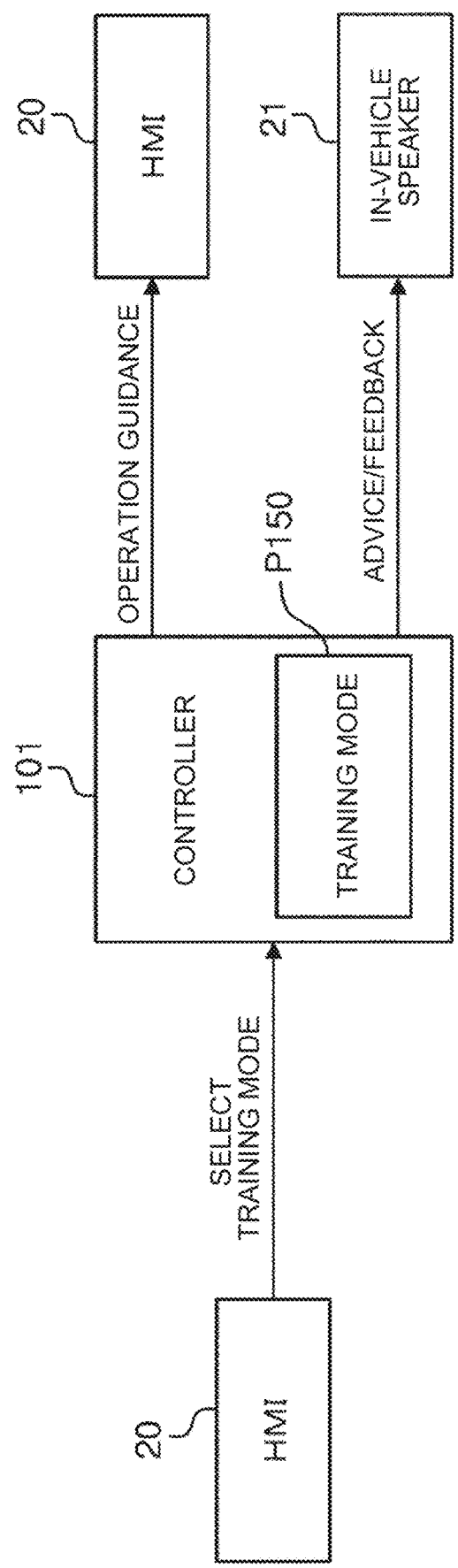
FIG. 7 shows an example of a method for setting the training mode.

The driver can set the training mode as desired. FIG. 7 shows an example of a method for setting the training mode. In the example shown in FIG. 7, the driver's selection of the training mode is entered to the HMI 20, and is then input from the HMI 20 to the controller 101. The controller 101 performs a process P150 in response to the selection of the training mode. In the process P150, trainings related to the selected training mode are executed.

Guidance regarding shift operations using the pseudo H-shifter 24 or the pseudo paddle shifter 25 and guidance regarding clutch operations using the pseudo clutch pedal 26 are displayed on the HMI 20 during execution of the trainings. For example, such guidance is about an exemplary method for performing shift operations and an exemplary method for performing clutch operations. When the predetermined conditions are met as a result of the trainings according to the guidance displayed on the HMI 20, the restriction functions such as acceleration/deceleration control that have been enabled upon selection of the manual mode can be disabled. The operation guidance may be read from the memory 103 of the controller 101 and displayed on the HMI 20, or may be downloaded from a server and displayed on the HMI 20 each time.

During execution of the trainings, advice or feedback is given to the driver by voice using the in-vehicle speaker 21. The advice is, for example, teaching tips on how to skillfully perform shift operations using the pseudo H-shifter 24 or the pseudo paddle shifter 25 or clutch operations using the pseudo clutch pedal 26. The advice is given according to the driver's current situation. The feedback is, for example, pointing out areas for improvement in shift operations or clutch operations performed by the driver. The scoring results of the shift operations or clutch operations performed by the driver may be notified in addition to pointing out areas for improvement. Instead of or in addition to the voice from the in-vehicle speaker 21, the content of the advice or feedback may be displayed on the HMI 20.

Figure 8:
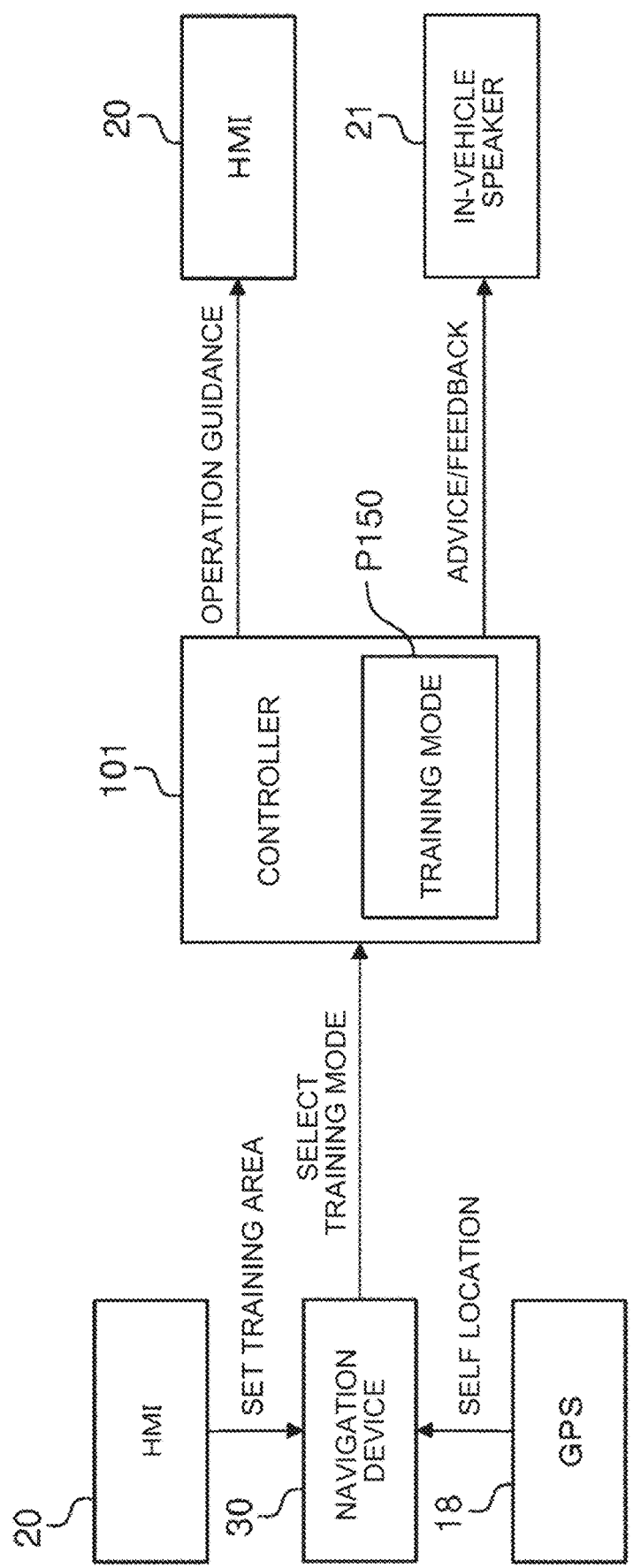
FIG. 8 shows another example of the method for setting the training mode.

Another example of the method for setting the training mode is to automatically set the training mode only for a preregistered area. FIG. 8 shows this example of the method for setting the training mode. In the example shown in FIG. 8, a training area set by the driver via the HMI 20 is input to a navigation device 30. It is possible to set a plurality of training areas, and it is also possible to select in advance, for each training area, which training mode to execute. The self location of the battery electric vehicle 100 estimated by a global positioning system (GPS) 18 is input to the navigation device 30. When the battery electric vehicle 100 enters the set training area, the navigation device 30 inputs the training mode selected in advance for that training area to the controller 101. The controller 101 performs a process P150 in response to the selection of the training mode. Areas where the training mode is executed include places where the driver can do trainings without worrying about the surroundings, such as a driving school or a large empty area.

6-4. Disabling Restriction Functions

As described above, even after the restriction functions to restrict the operation of the battery electric vehicle 100 in the manual mode are enabled, they can be disabled when the driver meets predetermined conditions. The conditions the driver need to meet in order to disable the restriction functions will be described below for each control mode. The driver may forcibly disable the restriction functions by his or her own will regardless of whether he or she meets the predetermined conditions. The restriction functions that have been enabled can be forcibly disabled via the touch panel display of the HMI 20.

Figure 9:
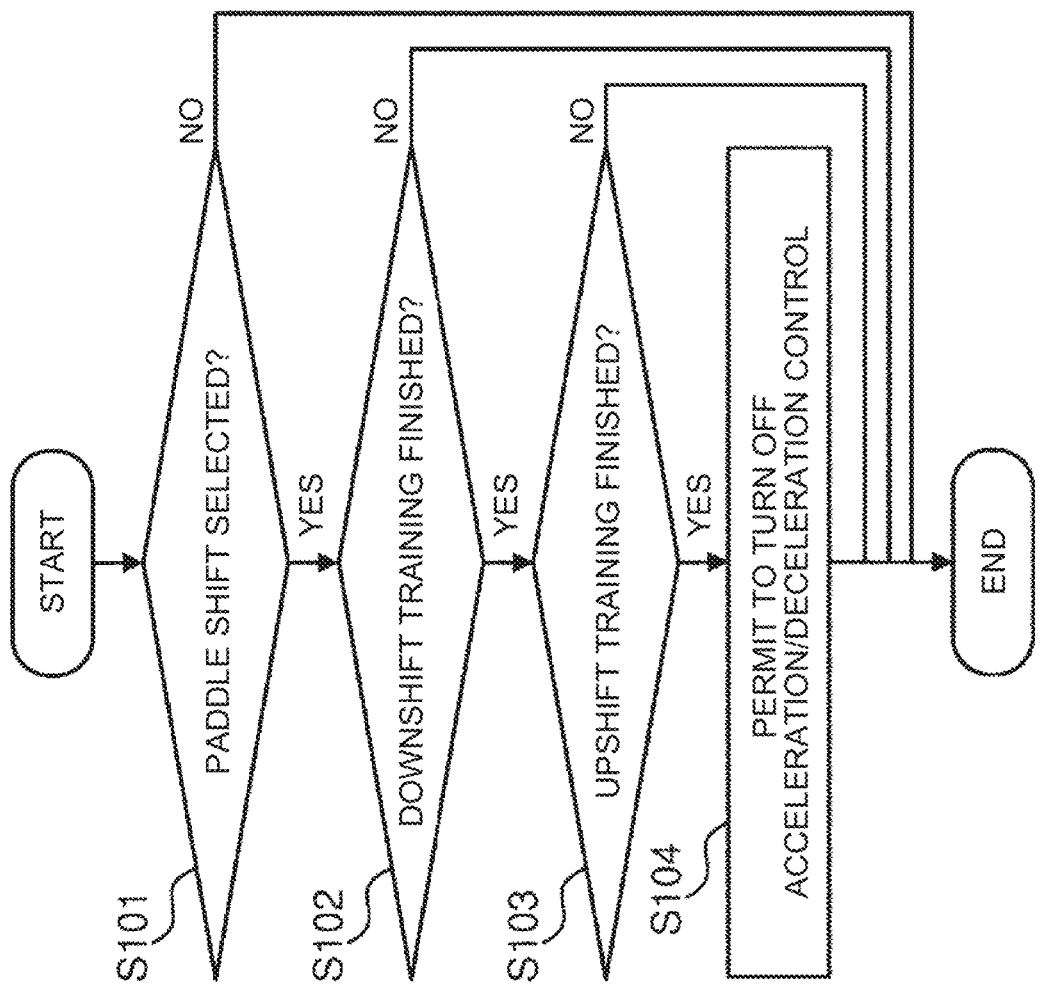
FIG. 9 is a flowchart showing a restriction function that is enabled when "paddle shift" is selected as the control mode, and conditions a driver need to meet in order to disable that restriction function.

FIG. 9 is a flowchart showing the restriction function that is enabled when "paddle shift" is selected as the control mode, and the conditions the driver need to meet in order to disable that restriction function. According to the flow shown in FIG. 9, it is first determined in step S101 whether "paddle shift" is selected as the control mode. When "paddle shift" is not selected, the flow ends.

When "paddle shift" is selected as the control mode, step S102 is performed. In step S102, it is determined whether the downshift training TR11 is finished. For example, the downshift training TR11 may be determined to be finished on the condition that the number of downshifts performed by operating the pseudo paddle shifter 25 exceeds a predetermined value. Alternatively, the downshift training TR11 may be determined to be finished on the condition that the difference between the actual timing of a downshift performed by operating the pseudo paddle shifter 25 and the target timing falls within an allowable range. When the downshift training TR11 is not finished, the flow ends.

When the downshift training TR11 is finished, step S103 is performed. In step S103, it is determined whether the upshift training TR12 is finished. For example, the upshift training TR12 may be determined to be finished on the condition that the number of upshifts performed by operating the pseudo paddle shifter 25 exceeds a predetermined value. Alternatively, the upshift training TR12 may be determined to be finished on the condition that the difference between the actual timing of an upshift performed by operating the pseudo paddle shifter 25 and the target timing falls within an allowable range. When the upshift training TR12 is not finished, the flow ends.

When the upshift training TR12 is finished, step S104 is performed. In step S104, the acceleration/deceleration control LM11 that is a restriction function is permitted to be turned off. After the acceleration/deceleration control LM11 is permitted to be turned off, the driver may leave the acceleration/deceleration control LM11 on, or may turn off the acceleration/deceleration control LM11 on the touch panel display of the HMI 20.

Figure 10:
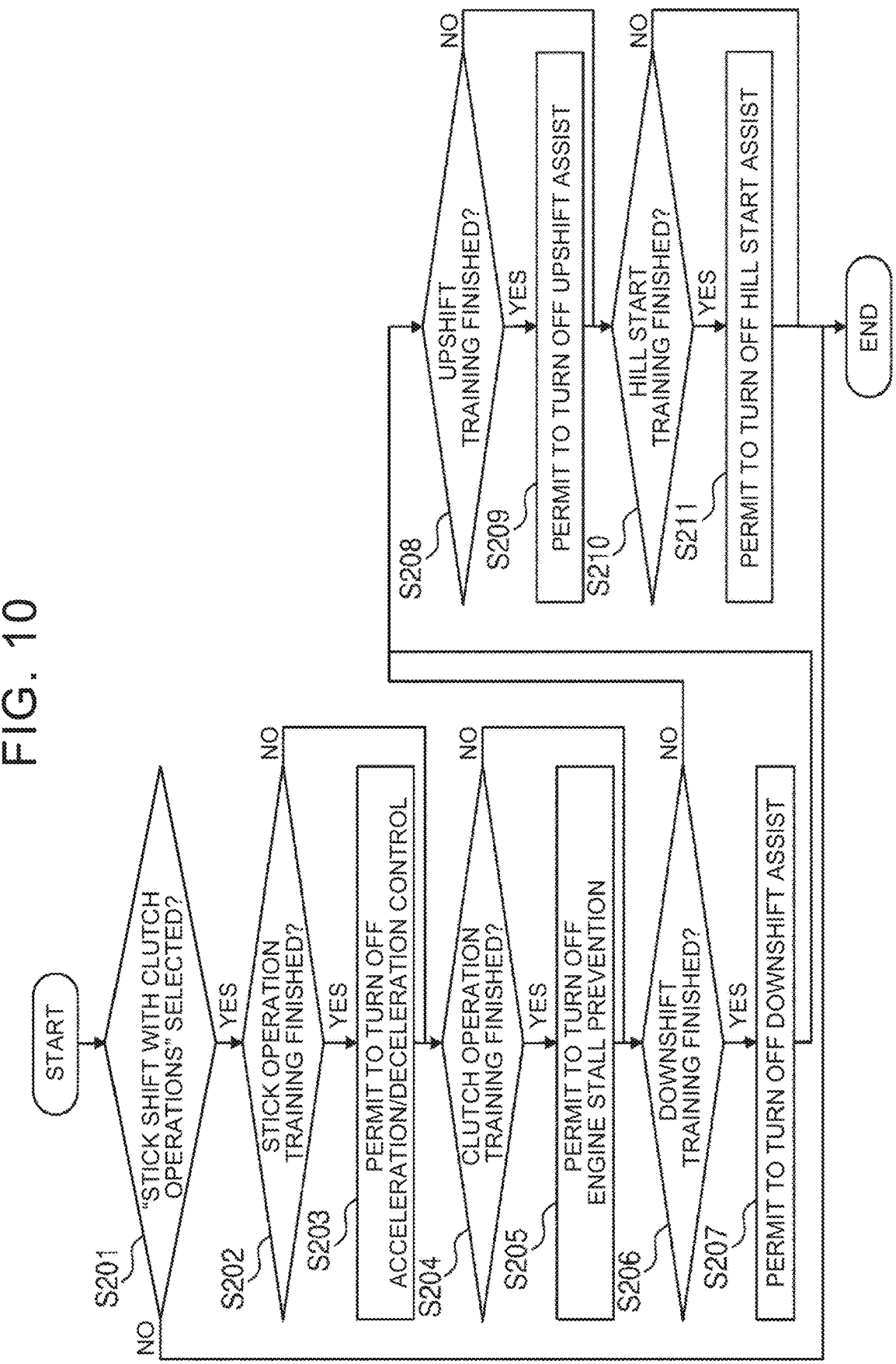
FIG. 10 is a flowchart showing restriction functions that are enabled when "stick shift with clutch operations" is selected as the control mode, and conditions the driver need to meet in order to disable those restriction functions.

FIG. 10 is a flowchart showing the restriction functions that are enabled when "stick shift with clutch operations" is selected as the control mode, and the conditions the driver need to meet in order to disable those restriction functions. According to the flow shown in FIG. 10, it is first determined in step S201 whether "stick shift with clutch operations" is selected as the control mode. When "stick shift with clutch operations" is not selected, the flow ends.

When "stick shift with clutch operations" is selected as the control mode, step S202 is performed. In step S202, it is determined whether the stick operation training TR21 is finished. For example, the stick operation training TR21 may be determined to be finished on the condition that the number of operations of the pseudo H-shifter 24 exceeds a predetermined value. Alternatively, the stick operation training TR21 may be determined to be finished on the condition that the operation speed of the pseudo H-shifter 24 exceeds a target speed.

When the stick operation training TR21 is finished, step S203 is performed. In step S203, the acceleration/deceleration control LM21 that is a restriction function is permitted to be turned off. After the acceleration/deceleration control LM21 is permitted to be turned off, the driver may leave the acceleration/deceleration control LM21 on, or may turn off the acceleration/deceleration control LM21 on the touch panel display of the HMI 20. When the stick operation training TR21 is not finished, step S203 is skipped.

Step S204 is then performed. In step S204, it is determined whether the clutch operation training TR22 is finished. For example, the clutch operation training TR22 may be determined to be finished on the condition that the number of operations of the pseudo clutch pedal 26 exceeds a predetermined value. Alternatively, the clutch operation training TR22 may be determined to be finished on the condition that a change in virtual engine speed associated with an operation of the pseudo clutch pedal 26 falls within an allowable range.

When the clutch operation training TR22 is finished, step S205 is performed. In step S205, the engine stall prevention LM22 that is a restriction function is permitted to be turned off. After the engine stall prevention LM22 is permitted to be turned off, the driver may leave the engine stall prevention L22 on, or may turn off the engine stall prevention LM22 on the touch panel display of the HMI 20. When the clutch operation training TR22 is not finished, step S205 is skipped.

Step S206 is then performed. In step S206, it is determined whether the downshift training TR23 is finished. For example, the downshift training TR23 may be determined to be finished on the condition that the number of downshift operations using the pseudo H-shifter 24 and the pseudo clutch pedal 26 exceeds a predetermined value. Alternatively, the downshift training TR23 may be determined to be finished on the condition that the difference between the virtual engine speed and the target speed when the virtual clutch is engaged by operating the pseudo clutch pedal 26 after downshifting by operating the pseudo H-shifter 24 falls within an acceptable range.

When the downshift training TR23 is finished, step S207 is performed. In step S207, the downshift assist LM23 that is a restriction function is permitted to be turned off. After the downshift assist L23 is permitted to be turned off, the driver may leave the downshift assist L23 on, or may turn off the downshift assist L23 on the touch panel display of the HMI 20. When the downshift training TR23 is not finished, step S207 is skipped.

Step S208 is then performed. In step S208, it is determined whether the upshift training TR24 is finished. For example, the upshift training TR24 may be determined to be finished on the condition that the number of upshift operations using the pseudo H-shifter 24 and the pseudo clutch pedal 26 exceeds a predetermined value. Alternatively, the upshift training TR24 may be determined to be finished on the condition that the speed at which the virtual clutch is engaged by operating the pseudo clutch pedal 26 after upshifting by operating the pseudo H-shifter 24 exceeds a target speed.

When the upshift training TR24 is finished, step S209 is performed. In step S209, the upshift assist LM24 that is a restriction function is permitted to be turned off. After the upshift assist L24 is permitted to be turned off, the driver may leave the upshift assist L24 on, or may turn off the upshift assist L24 on the touch panel display of the HMI 20. When the upshift training TR24 is not finished, step S209 is skipped.

Step S210 is the performed. In step S210, it is determined whether the hill start training TR25 is finished. For example, the hill start training TR25 may be determined to be finished on the condition that the number of operations of the pseudo clutch pedal 26 on uphill roads exceeds a predetermined value. Alternatively, the hill start training TR25 may be determined to be finished on the condition that the time it takes to bring the virtual clutch into a half clutch state by depressing the accelerator pedal 22 and operating the pseudo clutch pedal 26 after releasing the brake pedal 23 falls within a target time.

When the hill start training TR25 is finished, step S211 is performed. In step S211, the hill start assist LM25 that is a restriction function is permitted to be turned off. After the hill start assist L25 is permitted to be turned off, the driver may leave the hill start assist L25 on, or may turn off the hill start assist L25 on the touch panel display of the HMI 20. When the hill start training TR25 is not finished, step S211 is skipped.

Figure 11:
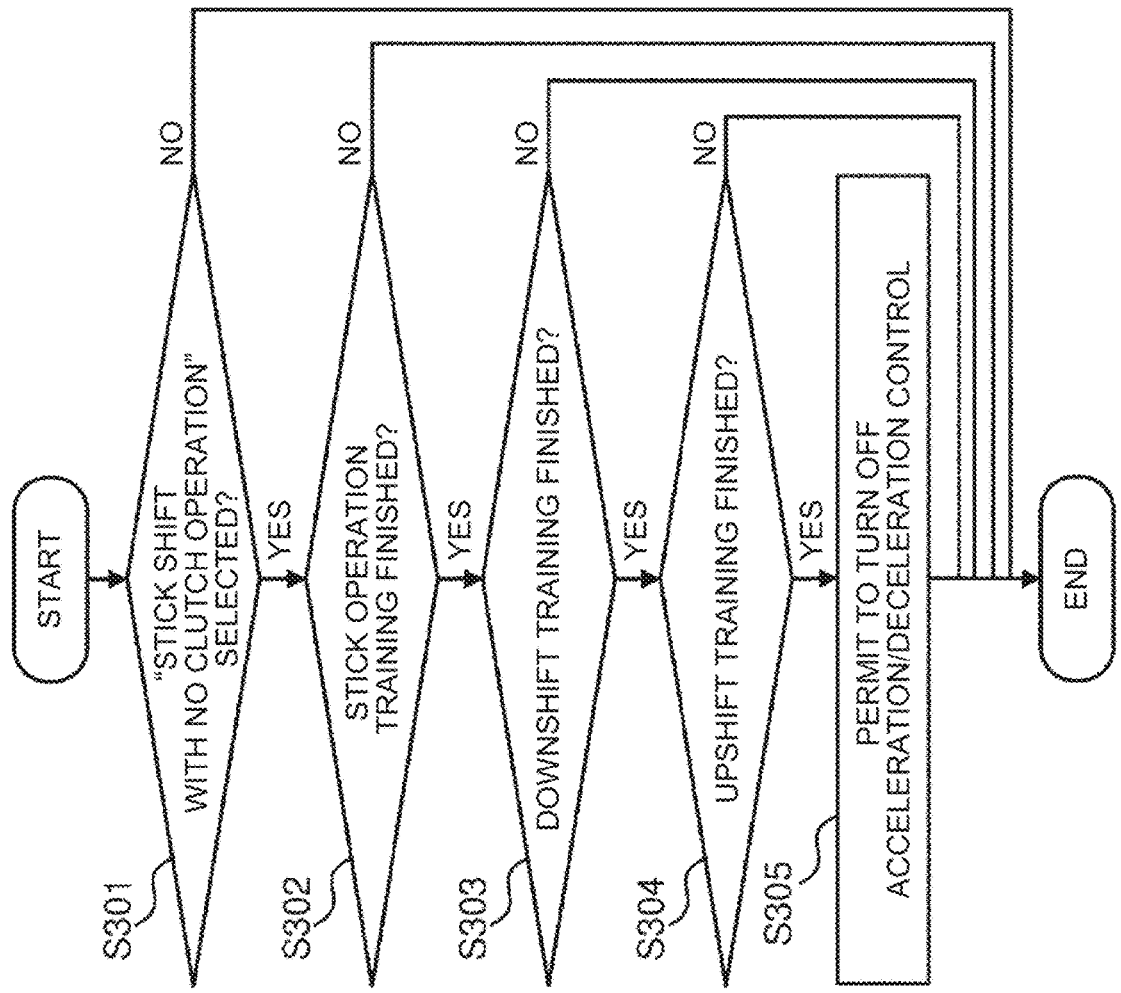
FIG. 11 is a flowchart showing a restriction function that is enabled when "stick shift with no clutch operation" is selected as the control mode, and conditions the driver need to meet in order to disable that restriction function.

FIG. 11 is a flowchart showing the restriction function that is enabled when "stick shift with no clutch operation" is selected as the control mode, and the conditions the driver need to meet in order to disable that restriction function. According to the flow shown in FIG. 11, it is first determined in step S301 whether "stick shift with no clutch operation" is selected as the control mode. When "stick shift with no clutch operation" is not selected, the flow ends.

When "stick shift with no clutch operation" is selected as the control mode, step S302 is performed. In step S302, it is determined whether the stick operation training TR31 is finished. For example, the stick operation training TR31 may be determined to be finished on the condition that the number of operations of the pseudo H-shifter 24 exceeds a predetermined value. Alternatively, the stick operation training TR31 may be determined to be finished on the condition that the operation speed of the pseudo H-shifter 24 exceeds a target speed. When the stick operation training TR31 is not finished, the flow ends.

When the stick operation training TR31 is finished, step S303 is performed. In step S303, it is determined whether the downshift training TR32 is finished. For example, the downshift training TR32 may be determined to be finished on the condition that the number of downshifts performed by operating the pseudo H-shifter 24 exceeds a predetermined value. Alternatively, the downshift training TR32 may be determined to be finished on the condition that the difference between the actual timing of a downshift performed by operating the pseudo H-shifter 24 and the target timing falls within an allowable range. When the downshift training TR32 is not finished, the flow ends.

When the downshift training TR32 is finished, step S304 is performed. In step S304, it is determined whether the upshift training TR33 is finished. For example, the upshift training TR33 may be determined to be finished on the condition that the number of upshifts performed by operating the pseudo H-shifter 24 exceeds a predetermined value. Alternatively, the upshift training TR33 may be determined to be finished on the condition that the difference between the actual timing of an upshift performed by operating the pseudo H-shifter 24 and the target timing falls within an allowable range. When the upshift training TR33 is not finished, the flow ends.

When the upshift training TR33 is finished, step S305 is performed. In step S305, the acceleration/deceleration control LM31 that is a restriction function is permitted to be turned off. After the acceleration/deceleration control LM31 is permitted to be turned off, the driver may leave the acceleration/deceleration control LM31 on, or may turn off the acceleration/deceleration control LM31 on the touch panel display of the HMI 20.

7. Effects

As described above, the battery electric vehicle 100 according to the embodiment includes the pseudo H-shifter 24, pseudo paddle shifter 25, and pseudo clutch pedal 26 that imitate operation members used to perform shifting operations of a manual transmission internal combustion engine vehicle. The controller 101 of the battery electric vehicle 100 can select the control mode (manual mode) in which the operations of these pseudo shifting operation members are associated with the torque of the electric motors 4F, 4R.

When the manual mode is selected, the restrictions that can be removed are imposed on the operations the battery electric vehicle 100 performs in response to the operations of the pseudo shifting operation members. Imposing such restrictions allows even a driver who has not driven a manual transmission internal combustion engine vehicle for a long time and a driver who has no experience driving a manual transmission internal combustion engine vehicle to easily experience as if they were operating a manual transmission internal combustion engine vehicle by selecting the manual mode.

The restrictions imposed on the operations of the battery electric vehicle 100 in the manual mode can be removed when the driver do the trainings in the training mode and meets the predetermined conditions. Removing the restrictions allows the battery electric vehicle 100 to replicate the operations a manual transmission internal combustion engine vehicle is supposed to perform in response to shift operations and clutch operations. Therefore, the driver who has become proficient in performing shift operations and clutch operations as a result of training can more enjoy the feel of a manual transmission internal combustion engine vehicle while driving the battery electric vehicle 100.

8. Other Embodiments

In the above embodiment, the restrictions imposed on the operations of the battery electric vehicle 100 are allowed to be removed when the driver meets the predetermined conditions. However, these restrictions may be allowed to be eased rather than being completely removed. For example, in the case of the acceleration/deceleration control LM11, the limit values of the acceleration and deceleration may be increased. In the case of the engine stall prevention LM22, engine stalls with large shocks may be prevented while permitting engine stalls with small shocks. In the case of the hill start assist LM25, a predetermined amount of rollback may be permitted.

As another configuration of the battery electric vehicle 100, the battery electric vehicle 100 may not include the pseudo paddle shifter 25, and may include only the pseudo H-shifter 24 and the pseudo clutch pedal 26. As still another configuration of the battery electric vehicle 100, the battery electric vehicle 100 may not include the pseudo H-shifter 24 and the pseudo clutch pedal 26, and may include only the pseudo paddle shifter 25. As yet another configuration of the battery electric vehicle 100, the battery electric vehicle 100 may not include the pseudo paddle shifter 25 and the pseudo clutch pedal 26, and may include only the pseudo H-shifter 24.

Although the battery electric vehicle 100 includes the electric motors 4F, 4R at the front and rear, the battery electric vehicle of the present disclosure may include only one of them. Although the battery electric vehicle 100 is a battery electric vehicle (BEV) that runs on the electricity stored in the battery 2, the battery electric vehicle of the present disclosure may be any battery electric vehicle that includes an electric motor as a driving source. Therefore, the battery electric vehicle of the present disclosure is also applicable to plug-in hybrid electric vehicle (PHEVs) and fuel cell electric vehicles (FCEVs).

What is claimed is:

1. A battery electric vehicle, comprising:
    an electric motor configured to serve as a driving source for the battery electric vehicle;
    a driving operation member configured to be used to drive the battery electric vehicle;
    a pseudo shifting operation member that imitates an operation member configured to be used to perform a shifting operation of a manual transmission internal combustion engine vehicle; and
    a controller configured to control the battery electric vehicle according to an operation of the driving operation member, wherein the controller is configured to
    execute, according to selection by a driver, a control mode in which an operation of the pseudo shifting operation member is associated with torque of the electric motor, and
    impose, when in the control mode, a restriction on an operation the battery electric vehicle performs in response to the operation of the pseudo shifting operation member, the restriction being able to be removed or eased, wherein the controller is further configured to set the restriction when the battery electric vehicle is located within a predetermined area.

2. The battery electric vehicle according to claim 1, wherein the controller is further configured to remove or ease the restriction when the driver meets a predetermined condition regarding the operation of the pseudo shifting operation member in the control mode.

3. The battery electric vehicle according to claim 1, wherein the controller is further configured to set the restriction in response to an instruction received from the driver.

4. The battery electric vehicle according to claim 2, further comprising an interface configured to provide information to the driver, wherein the controller is further configured to provide information about the operation of the pseudo shifting operation member for the driver to meet the condition to the driver via the interface during driving in the control mode.

5. The battery electric vehicle according to claim 1, further comprising an interface configured to provide information to the driver, wherein the controller is further configured to provide advice or feedback regarding the operation of the pseudo shifting operation member by the driver to the driver via the interface during driving in the control mode.

6. The battery electric vehicle according to claim 1, wherein:
    the driving operation member includes an accelerator pedal; and
    the pseudo shifting operation member includes
        a pseudo H-shifter imitating an H-shifter of a manual transmission, and
        a pseudo clutch operation device imitating a clutch operation device.

7. The battery electric vehicle according to claim 6, wherein the controller is configured to, when in the control mode, change the torque of the electric motor according to a shift position selected with the pseudo H-shifter, an amount of operation of the pseudo clutch operation device, and an amount of operation of the accelerator pedal.

8. The battery electric vehicle according to claim 1, wherein:
    the driving operation member includes an accelerator pedal; and
    the pseudo shifting operation member includes a pseudo sequential shifter imitating a sequential shifter of a manual transmission.

9. The battery electric vehicle according to claim 8, wherein the controller is configured to, when in the control mode, change the torque of the electric motor according to a shift position selected with the pseudo sequential shifter and an amount of operation of the accelerator pedal.

10. The battery electric vehicle according to claim 1, wherein:
    the driving operation member includes an accelerator pedal; and
    the pseudo shifting operation member includes a pseudo H-shifter imitating an H-shifter of a manual transmission.

11. The battery electric vehicle according to claim 10, wherein the controller is configured to, when in the control mode, change the torque of the electric motor according to a shift position selected with the pseudo H-shifter and an amount of operation of the accelerator pedal.

* * * * *